United States Patent [19]

Matoba et al.

[11] Patent Number: 5,086,388
[45] Date of Patent: Feb. 4, 1992

[54] SEMICONDUCTOR SERIAL/PARALLEL-PARALLEL/SERIAL FILE MEMORY AND STORAGE SYSTEM

[75] Inventors: Mikio Matoba; Ken Sugawara, both of Ibaraki; Shigeru Sakairi, Tsukuga, all of Japan

[73] Assignee: Hitachi Maxell, Ltd., Osaka, Japan

[21] Appl. No.: 324,823

[22] Filed: Mar. 17, 1989

[30] Foreign Application Priority Data

Mar. 18, 1988 [JP] Japan ................... 63-65268

[51] Int. Cl.⁵ .................. G06F 7/00; G11C 8/00; G11C 7/00
[52] U.S. Cl. ........................ 395/425; 365/219
[58] Field of Search .............. 364/200, 900; 365/230.01, 219, 220, 221

[56] References Cited

U.S. PATENT DOCUMENTS

| | | | |
|---|---|---|---|
| 3,691,538 | 9/1972 | Haney et al. | 365/104 |
| 4,044,339 | 8/1977 | Berg | 365/189.12 |
| 4,183,095 | 1/1980 | Ward | 365/200 X |
| 4,204,250 | 5/1980 | Getson et al. | 364/200 |
| 4,450,538 | 5/1984 | Shirasaka | 365/219 X |
| 4,945,518 | 7/1992 | Muramatsu | 365/219 X |

Primary Examiner—Alyssa H. Bowler
Attorney, Agent, or Firm—Birch, Stewart, Kolasch & Birch

[57] ABSTRACT

A semiconductor file memory has a semiconductor memory connected to an information processor and operated to store data transferred from the information processor and read out stored data, the file memory comprising a serial/parallel conversion circuit which receives, in a serial manner, data to be stored in the semiconductor memory and converts the data line parallel data, a parallel/serial conversion circuit which receives data read out of the semiconductor memory and converts the data into serial data, and an address data holding circuit which holds address data transferred from the information processor, the serial data transferred from the information processor being converted into parallel data by the serial/parallel conversion circuit and the converted data stored in the semiconductor memory in accordance with addresse data held in the address data holding circuit, and parallel data stored in the semiconductor memory is read out in accordance with address data held in the address data holding circuit, the readout data being converted into serial data by the parallel/serial conversion circuit and the converted data is being transferred to the information processor.

11 Claims, 7 Drawing Sheets

SEMICONDUCTOR SERIAL/PARALLEL-PARALLEL/SERIAL FILE MEMORY AND STORAGE SYSTEM

BACKGROUND OF THE INVENTION

1. Field of the Invention

This invention relates to a semiconductor file memory and a storage system which uses the semiconductor file memory, and more particularly to the improvement of a data transfer system intended for a file memory which necessitates a smaller number of connection pins, stores transferred data in variable data length and reads out data in variable data length.

2. Discussion of Related Art

Generally, an external storage of information processor, such as a magnetic recording medium or file memory, operates to exchange information with the host information processor in either parallel data transmission mode or serial data transmission mode, the latter being the case of serial data processing for a sequential file as disclosed in SCSI or the like. Information transaction based on serial transmission generally uses block transfer.

Conventional file memories, which use the parallel I/O interface, have increased the number of address signal lines as semiconductor memory devices have become more capacious, resulting in an increased number of connector pins of the file memories. In parallel data transmission, the number of connection lines increases in proportion to the number of bits of transmission, and at the same time the volume of data transmission in a unit time length also increases. In contrast, serial data transmission is advantageous in a smaller number of connection lines required, but it is limited in the volume of data transmission in a unit time length.

A file memory with an increased number of connection pins suffers increased insertion and extraction forces, increased possibility of contact failure, and degraded operability and reliability attributable to the influence of dirt and dust. On this account, an alternative idea is to transfer data in a serial manner. When serial data is transferred in the block transmission mode, with the intention of efficient data transfer, the volume of transaction data in a block is constant, i.e., fixed-length block transmission, which compels the information processor to access to a certain amount of data regardless of the data volume in need. This is unfavorable for the information processor in expending idle time for making access to a piece of data (minimal unit data) in a specific address.

This impropriety may be avoided by transferring the address and data in pair in a serial manner, and data in a specific address can be accessed in a shorter time, but at the expense of increased time for transferring a large volume of data.

SUMMARY OF THE INVENTION

An object of this invention is to overcome the foregoing prior art deficiencies and to provide a semiconductor file memory which requires a small number of connection pins, smaller insertion and extraction forces, and has higher reliability.

Another object of this invention is to overcome the degradation of information processing speed attributable to serial data transmission and to provide a semiconductor file memory which transfers a large volume of data efficiently to meet the volume of transmission data.

A further object of this invention is to provide a storage system which requires a smaller number of connection pins, in which it is easy to mount and dismount a file memory, and is highly reliable.

In order to achieve the above objectives, a semiconductor file memory having a semiconductor memory, which is connected to an information processor to transact data, comprises a serial/parallel conversion circuit which receives serial data to be stored in the semiconductor memory and converts it into parallel data, a parallel/serial conversion circuit which receives parallel data read out of the semiconductor memory and converts it into serial data, an extraction circuit which extracts address data from serial data transfer from the information processor, and an address data holding circuit which holds address data extracted by the extraction circuit, and operates to store serial write data transferred from the information processor, by converting it into parallel data with the serial/parallel conversion circuit, in the semiconductor memory in accordance with address data held in the address data holding circuit, and to transfer parallel data read out of the semiconductor memory, by converting it into serial data with the parallel/serial conversion circuit, to the information processor in accordance with address data held in the address data holding circuit.

A semiconductor file memory comprises a semiconductor memory, an interface which receives from an external device a serial data string containing address information indicative of the starting address of the semiconductor memory, transfer word volume information and transmission data, an address access circuit which addresses the semiconductor memory, and a transfer end detection circuit, and operates as follows. The interface separates transfer word volume information from the serial data string and provides it to the end detection circuit and separates the address information from the serial data string and sets the information in the address access circuit so that it is incremented or decremented for storing transferred data or reading data out of the semiconductor memory, and the end detection circuit detects the end of transferred data on the basis of the transfer word volume information, and terminates the data writing or reading in response to the detection.

A storage system using a semiconductor file memory comprises a serial/parallel conversion circuit which receive serial data to be stored in a semiconductor memory and converts it into parallel data, a parallel/serial conversion circuit which receives parallel data read out of the semiconductor memory and converts it into serial data, an extraction circuit which extracts address data from serial data transferred from an information processor, and an address data holding circuit which holds address data extracted by the extraction circuit. In operation, the serial/parallel conversion circuit converts serial write data transferred from a driver into parallel data and it is stored in the semiconductor memory in accordance with address data held in the address data holding circuit, the parallel/serial conversion circuit reads parallel data out of the semiconductor memory in accordance with address data held in the address data holding circuit, converts it into serial data and delivers it to the driver, and the driver transfers data from the semiconductor file memory to the information processor and transfers data from the information processor to the semiconductor external memory.

This invention is intended to receive serial transfer data and convert it into parallel data inside the semiconductor file memory before it is stored in the semiconductor memory, and to read parallel data out of the semiconductor memory and converts it into serial data inside the file memory before it is transferred to the outside, whereby the number of connection lines led out to external devices can be reduced, and, as a result, the number of connector pins can be reduced. Accordingly, it requires small insertion and extraction forces, and a highly reliable semiconductor file memory can be realized.

According to this invention, the semiconductor external storage receives a serial data string, in which are included the starting address of a data access region of the semiconductor memory, transfer word volume information or transfer end information indicative of the volume of data transaction and transmission data corresponding to the address, and the semiconductor file memory sets the starting address in the address access circuit and sends the transfer word volume information or the like to the end detection circuit thereby to access the semiconductor memory only for the number of data indicated by the transfer word volume, whereby only necessary data can be stored and read out.

As a result, data can be stored and read out, in variable quantity, and the transfer data volume can be changed at each transfer. This allows fast access to a specific address and enables mass data to be transferred at high transfer rate in block transfer mode, whereby efficient data transmission which matches the data transfer volume can be realized.

DESCRIPTION OF THE PREFERRED EMBODIMENTS

Embodiments of this invention will be described with reference to the drawings.

Figure 1:
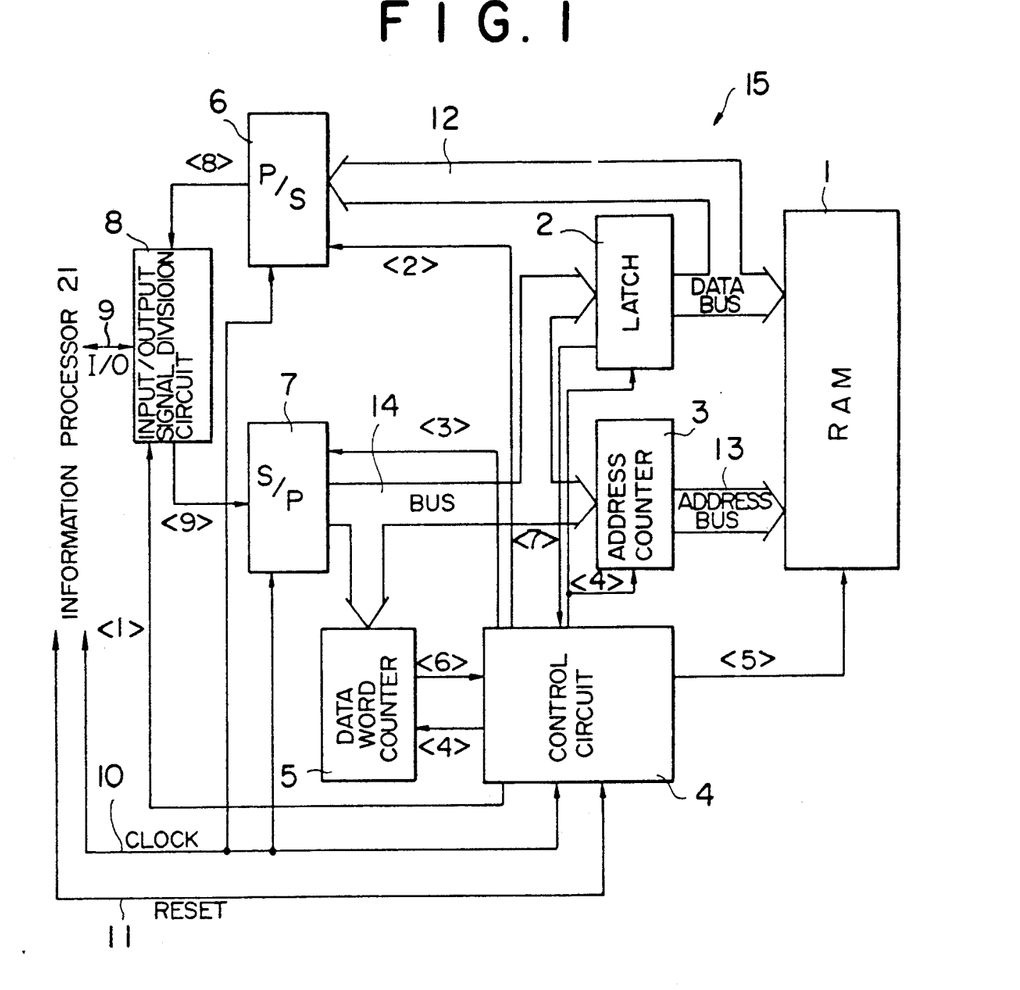
FIG. 1 is a block diagram showing an embodiment of the inventive semiconductor file memory.

FIG. 1 shows an embodiment of the inventive semiconductor file memory. A RAM 1 serves as a semiconductor memory for storing data. The RAM 1 is connected through a data bus 12 to a latch circuit 2, from which the RAM 1 receives data at storing. The RAM 1 is connected through an address bus 13 to an address counter 3, from which the RAM 1 receives the address value at both data writing and reading for addressing. The RAM 1 is further connected through the data bus 12 to a parallel/serial (P/S) conversion circuit 6, in addition to the latch circuit 2, to which the RAM 1 delivers readout data.

An information processor which stores data in the semiconductor file memory 15 and reads data out of it provides serial input data over an input/output signal line 9 to an input/output signal division circuit 8, from which the data is sent to a serial/parallel (S/P) conversion circuit 7. The input/output division circuit 8 comprises a microprocessor, memory and a control program stored in the memory.

The input/output division circuit 8 is responsive to the control signal from a control circuit 4 to switch the input/output direction, divides the input data for extraction into data to various destinations, and supplies the extracted data to respective circuits by way of the serial/parallel conversion circuit 7.

Figure 2:
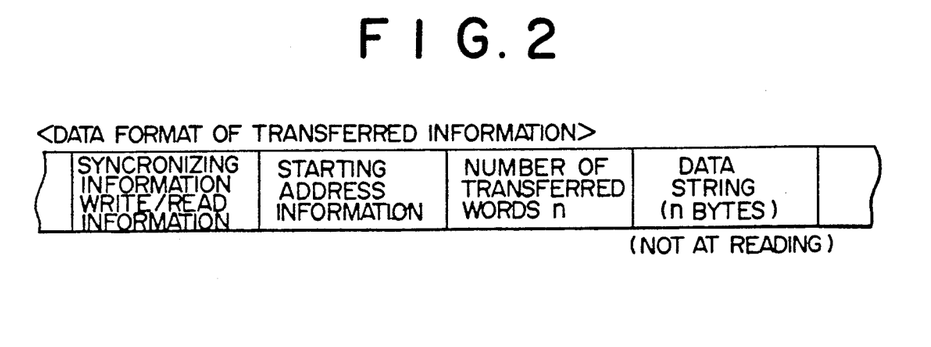
FIG. 2 is a diagram showing the format of information transferred from the information processor to the semiconductor file memory in the embodiment of FIG. 1.

The information processor 21 sends data in the transfer information format as shown in FIG. 2, for example, over the line 9 to the semiconductor file memory 15. The transfer information format includes synchronizing information, write/read information, starting address information, number of transferred data words n, and data string (n bytes). In the example of FIG. 2, at data writing, "write information" is selected at the top of the format, and at data reading, "read information" is selected at the top of the format and "data string" at the end of the format is removed.

At data reading, when output data is sent from the RAM 1 over the data bus 12 to the parallel/serial conversion circuit 6, the resulting serial data is sent over the input/output signal line 9 to the information processor. The serial/parallel conversion circuit 7 is connected through a bus 14 to the latch circuit 2, address counter 3, and a data word counter 5 which counts the number of data words and it operates to convert the input data into parallel data.

Namely, transfer information data in the format, as shown in FIG. 2, sent as serial data from the external information processor 21 is divided for extraction by the input/output signal division circuit 8, and distributed through the serial/parallel conversion circuit 7 and common bus 14. Among the data, "number of transferred data words" is set in the data word counter 5, "starting address information" is set in the address counter 3, and "data string" is stored in the latch circuit 2 at data writing. Held in the latch circuit 2 are "synchronizing information" and one of "write information", and "read information" among the data format shown in FIG. 2. After data has been latched, the control circuit 4 makes access to the latch circuit 2 using a line 7 to determine whether the data is read information or write information.

These circuits and RAM 1 are controlled by the control circuit 4, which incorporates a microprocessor and memory for example and operates to receive transfer information data (control signals for writing or reading) sent from the external information processor and further receive a clock signal (CLOCK) and reset signal (RESET) sent from the external information processor over a clock signal line 10 and reset signal line 11. In response to these signals, the control circuit 4 controls the above-mentioned circuits and RAM 1 at certain timings thereby controlling data writing and reading.

Under control of the control circuit 4, serial data transferred from the external information processor is reformed into parallel data inside the serial/parallel conversion circuit 7 and stored in the RAM 1, and parallel data to be transferred to the external information processor is read out of the RAM 1 and reformed into serial data inside the parallel/serial conversion circuit 6 and transferred to the external information processor. The parallel/serial conversion circuit 6 and serial/parallel conversion circuit 7 receive a clock signal to time their data conversion processes.

Figure 3:
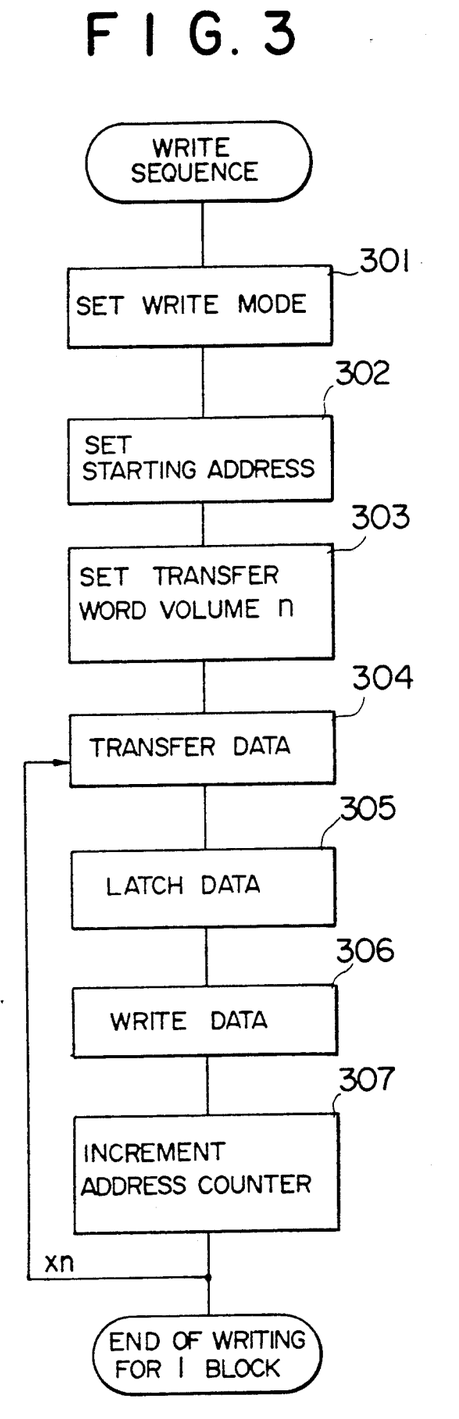
FIG. 3 is a flowchart showing the sequence of writing data to the semiconductor file memory in the embodiment of FIG. 1.
Figure 4:
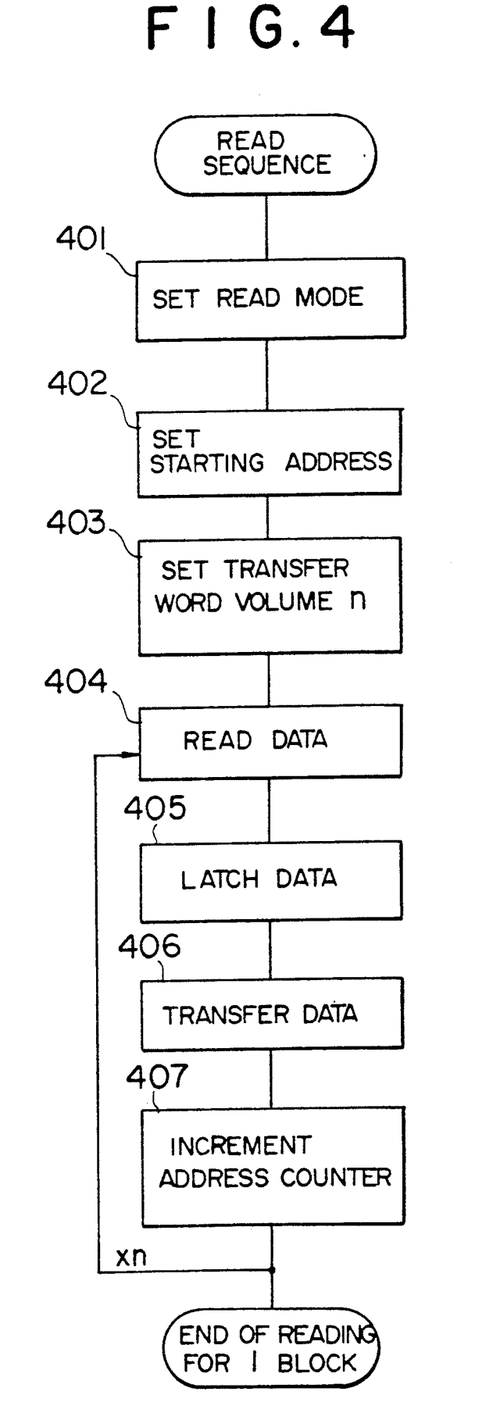
FIG. 4 is a flowchart showing the sequence of reading data from the semiconductor file memory in the embodiment of FIG. 1.
Figure 5:
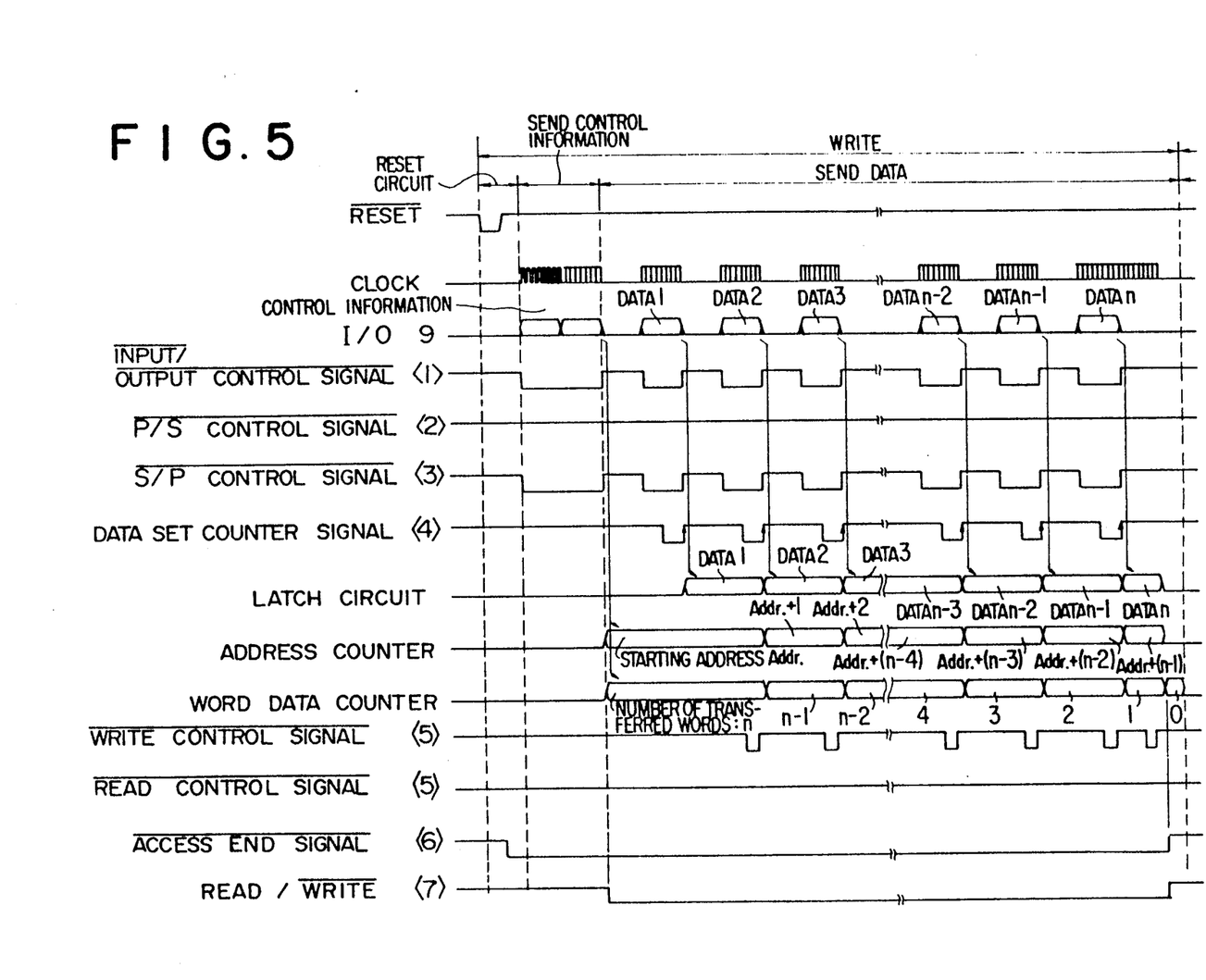
FIG. 5 is a timing chart showing the states of signals according to data writing shown in FIG. 3, on the signal lines of the semiconductor file memory of FIG. 1.
Figure 6:
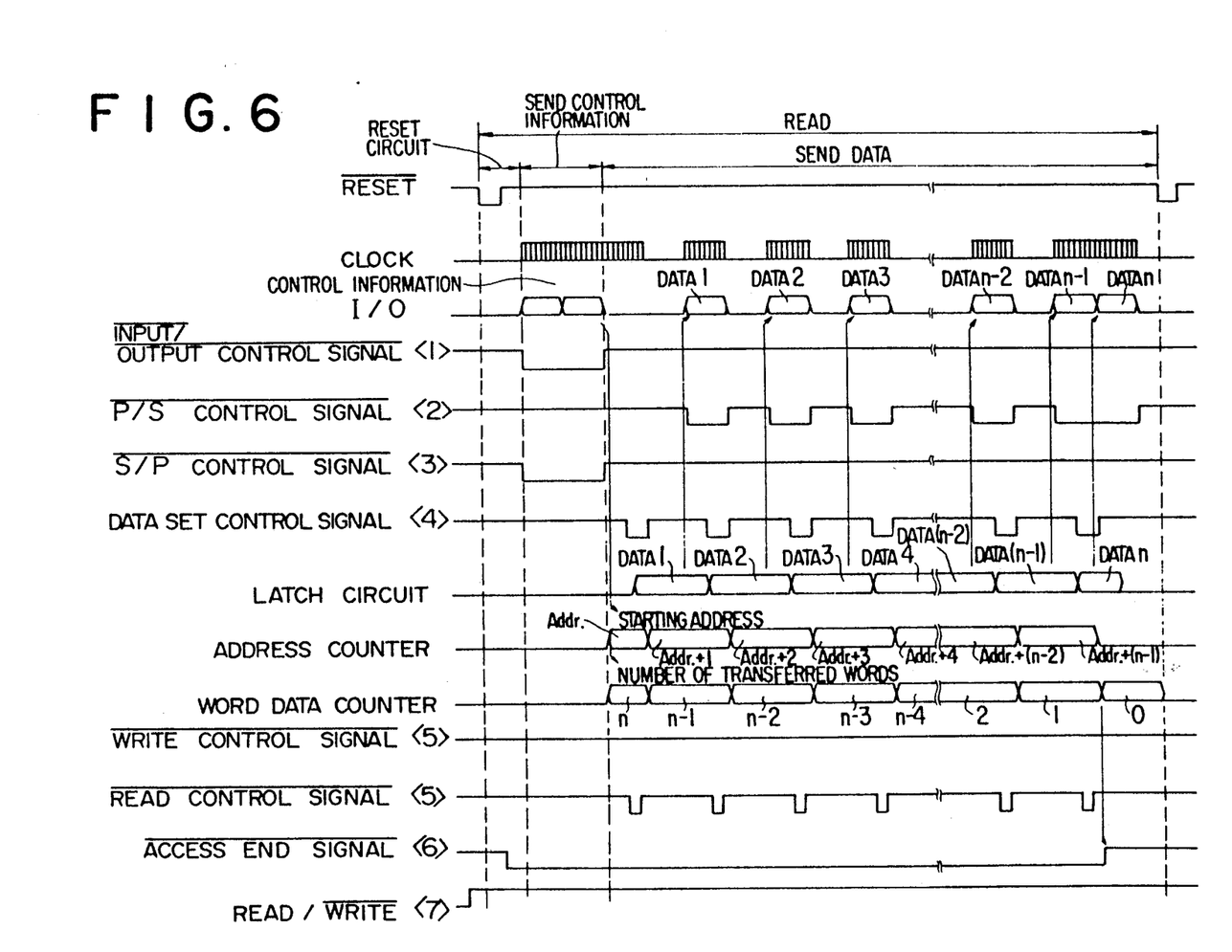
FIG. 6 is a timing chart showing the states of signals according to data reading shown in FIG. 4, on the signal lines of the semiconductor file memory of FIG. 1.

The following describes the overall sequence of data writing and reading in the semiconductor file memory 15 with reference to FIGS. 3 and 4, and the detailed operation of each functional block on the timing chart of major signals shown in FIGS. 5 and 6.

As shown in FIG. 3 for the data writing process, write mode is set in the control circuit 4 (step 301), the starting address is set in the address counter 3 (step 302), and the number of write data words n is set in the data word counter 5, and then the data writing operation takes place in accordance with the clock. Initially, write data is transferred to the latch circuit 2 (step 304) and it is latched (step 305). Then data is stored in the RAM 1 (step 306) and the contents of the address counter 3 is incremented (step 307). The routine from step 304 to step 307 is repeated for the number of times equal to the number of words set in the data word counter 5, and the write operation for one block is complete.

At reading data out of the semiconductor file memory 5, the read mode is set in the control circuit 4, the readout starting address of RAM 1 is set in the address counter 3 and the number of readout words n is set in the data word counter 5, and then the reading operation begins. Data is read from the specified readout starting address of the RAM 1 (step 404) and, after the data is latched temporarily in the latch circuit 2 (step 405), it is transferred to the parallel/serial conversion circuit 6 (step 406). At the same time, the address counter 3 has its contents incremented by one (step 407), and data reading for one word is complete. The routine from step 404 to step 407 is repeated for the number of times equal to the number of words n set in the data word counter 5, and the read operation for one block is complete.

The operation will be explained in more detail with reference to the timing chart of the signals. For data writing, as shown in FIG. 5, the control circuit 4, which waits for an entry is reset by the RESET signal and transferred information data sent over the input/output signal line 9 and entered into the input/output signal division circuit 8 is divided for extraction. The extracted starting address for writing to the RAM 1 is set in the address counter 3, and subsequently the extracted word volume for writing is set in the data word counter 5. Prior to these operations, the control circuit 4 is placed in the control status of writing by the WRITE information carried by the signal <7>.

The control circuit 4 issues an input/output signal <1> to the input/output signal division circuit 8 in accordance with the clock and issues a S/P control signal <3> to the serial/parallel conversion circuit 7, and operates on the latch circuit 2 to latch data 1 at the top at the timing of the clock. On completion of latching one byte of data, for example, in the latch circuit 2, the data 1 is written in accordance with a control signal <5> in the starting write address set in the address counter 3. At the writing of one word, the address counter 3 has its address incremented as Addr. +1. As an alternative addressing scheme, a certain address value is preset and it is decremented at each writing of a word. In correspondence to the 1-word writing, the data word counter 5 has its contents n subtracted by one. The data writing operation is repeated for n words, and when the contents of data word counter 5 reaches "0", it issues an access end signal <6> indicative of the end of writing of n-word data in the RAM 1 to the control circuit 4, and the semiconductor file memory 15 enters the input wait state.

Although in the above description the data word counter is preset to the count value n equal to the number of write data words at the stage of initial setting, it is subtracted at each writing of one word from the latch circuit 2 to the RAM 1, and the access end signal <6> is issued to the control circuit 4 when the count value reaches zero. An alternative scheme is to increment the data word counter in response to each data writing and to detect the end of one block data transfer when the preset count value reaches n.

For reading data out of the semiconductor file memory 15, the control circuit 4 is placed in the read mode by the entry of a READ signal following the RESET signal. The procedure similar to that of writing is followed to set the read starting address in the address counter 3 and, at the same time, the number of readout data words n is set in the data word counter 5. A read control signal <5> is issued to the RAM 1 in accordance with the clock, data 1 from the starting read address of the RAM 1 is read out to the latch circuit 2, and data in byte length, for example, is transferred from the latch circuit 2 to the parallel/serial conversion circuit 6. At this time, the input/output control signal <1> and P/S control signal are issued to the input/output division circuit 8 and parallel/serial conversion circuit 6 for transferring the readout data to the information processor 21.

In response to the data transfer from the latch circuit 2 to the parallel/serial conversion circuit 6, the readout address in the address counter 3 is incremented by one, and the number of words n set in the data word counter 5 is decremented. When the count value of the data word counter 5 reaches zero, the access end signal <6> is issued by the data word counter 5 to the control circuit 4, and the read operation is complete. The count operations of the address counter 3 and data word counter 5 may be modified as mentioned previously for the write operation.

In writing or reading the RAM 1, particularly in the case of transferring data from the information processor, the transfer information data includes transfer word volume information (number of transfer words and starting address) in addition to the starting address information so that the number of transferred words is memorized on the part of the file memory 15 for carrying out data writing and reading in accordance with that information, and a series of operations for writing or reading data in the file memory 15 can take place in response to a single data transfer operation of the information processor. In this case, data is transferred in block transfer mode with the data volume being variable. On this account, even a piece of 1-byte data to a specific address can be transferred efficiently.

As an alternative scheme, the read/write control may be such that part of the data provided for the data word counter 5 is decoded in the data word counter 5 or by the control circuit 4 so that the control circuit 4 has control of the write/read operation, or that the write/read control signal is sent independently from the external information processor over the write/read control signal line. Furthermore, the input/output signal division circuit 8 may be designed so that it separates commands from the transferred data and the control circuit 4 receives the commands.

According to this embodiment, the information processor has as little as five to six lines connected to the file memory 15 inclusive of the power and ground lines.

Figure 7:
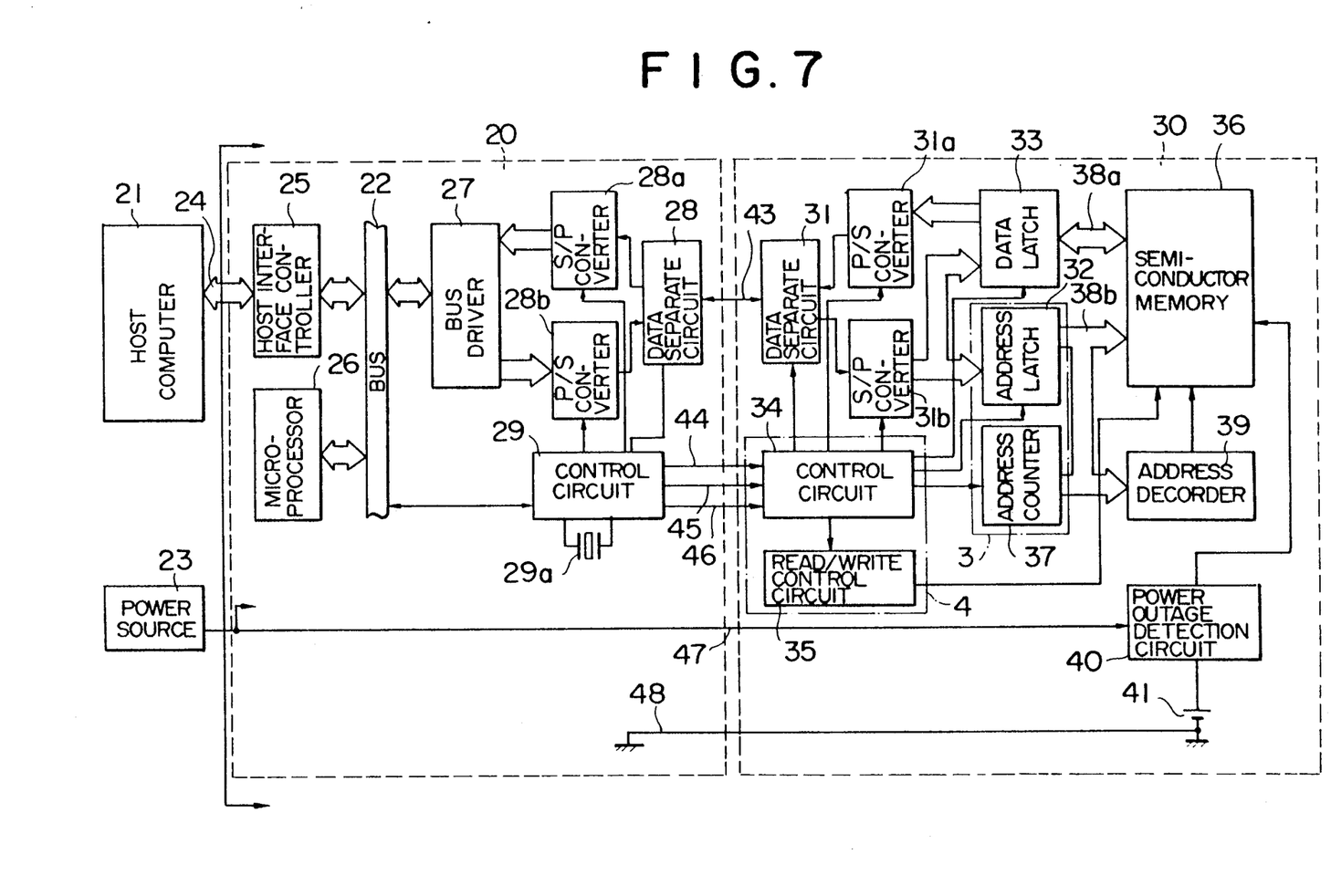
FIG. 7 is a block diagram showing another embodiment of the present invention, in which the semiconductor file memory is connected to the information processor through a read/write control driver.

FIG. 7 shows another embodiment of this invention, in which the foregoing semiconductor file memory is connected detachably to the bus of the information processor through a file memory driver 20. The driver 20 and file memory 30 are connected detachably through several signal lines, and this configuration is advantageous in the reduction of connecting points and also the enhancement of reliability.

In FIG. 7, the semiconductor file memory 30, is connected through the driver 20 to a host computer 21 that is an information processor. The driver 20 and host computer 21 have a parallel connection of host interface bus 24, and the driver 20 operates in accordance with commands sent from the host computer 21. The driver 20 and file memory 30 have the transaction of address data through an input/output signal line 43, and they have further connections by a signal line 44 for the transfer information synchronizing signal, a signal line 45 for the reset signal which initiates the circuits, a signal line 46 for the write/read control signal, a power line 47 connected to a power source 23, and a ground line 48.

The driver 20 operates by being controlled by an internal microprocessor 26 to receive data transferred from the host computer 21 by way of a host interface controller 25, e.g., SCSI protocol controller. Under control of the microprocessor 26, the transferred data is delivered to the bus driver 27 through the access to the address area assigned by the microprocessor 26. A command sent from the host computer 21 is decoded by the microprocessor 26 so that the read/write control circuit 29 is controlled accordingly, and the write/read control signal is sent to the file memory 30 over the control signal line 46. Indicated by 29a is an oscillation element provided externally to the control circuit 29, based on which the internal oscillation circuit produces the clock signal at the specified frequency.

The embodiment shown in FIG. 7 will be explained for its data writing operation with reference to the flowchart of FIG. 8. In this embodiment, a string of transferred data is treated as a block. In the case of data transfer from the host computer 21 to the file memory 30 for writing, the starting address of the data block is first transferred (step 801), which is converted into serial information by a parallel/serial (P/S) conversion circuit 28b and transferred to the file memory 30 by way of the data separation circuit 28 over the input/output signal line 43 (step 803). Upon receiving the starting address on the data separation circuit 31 in connection with the input/output signal line 43 (step 811), the file memory 30 operates on its serial/parallel conversion circuit 31b to convert the address data back to parallel data and holds it in an address latch circuit 32 (step 812).

In case the control circuit 34 receives the write control signal from the driver 20, it holds the address data in the address latch circuit 32, and thereafter operates on the serial/parallel conversion circuit 31b to convert serial data transferred from the driver 20 into parallel data and holds it in the data latch circuit 33 (steps 805-808). After the address data has been established in the address latch circuit 32, the control circuit 34 operates on the read/write control circuit 35 to send the write control signal to the semiconductor memory 36 (step 809), and the data in the data latch circuit 33 is stored in the semiconductor memory 36 (steps 814-816). The address counter 37 is incremented by the control circuit 34 (step 810). Similarly, after the next data has been latched, the address value in the address counter circuit 37 is incremented. By repeating the steps from 805 to 810 data is stored sequentially in the semiconductor memory 36.

Figure 8:
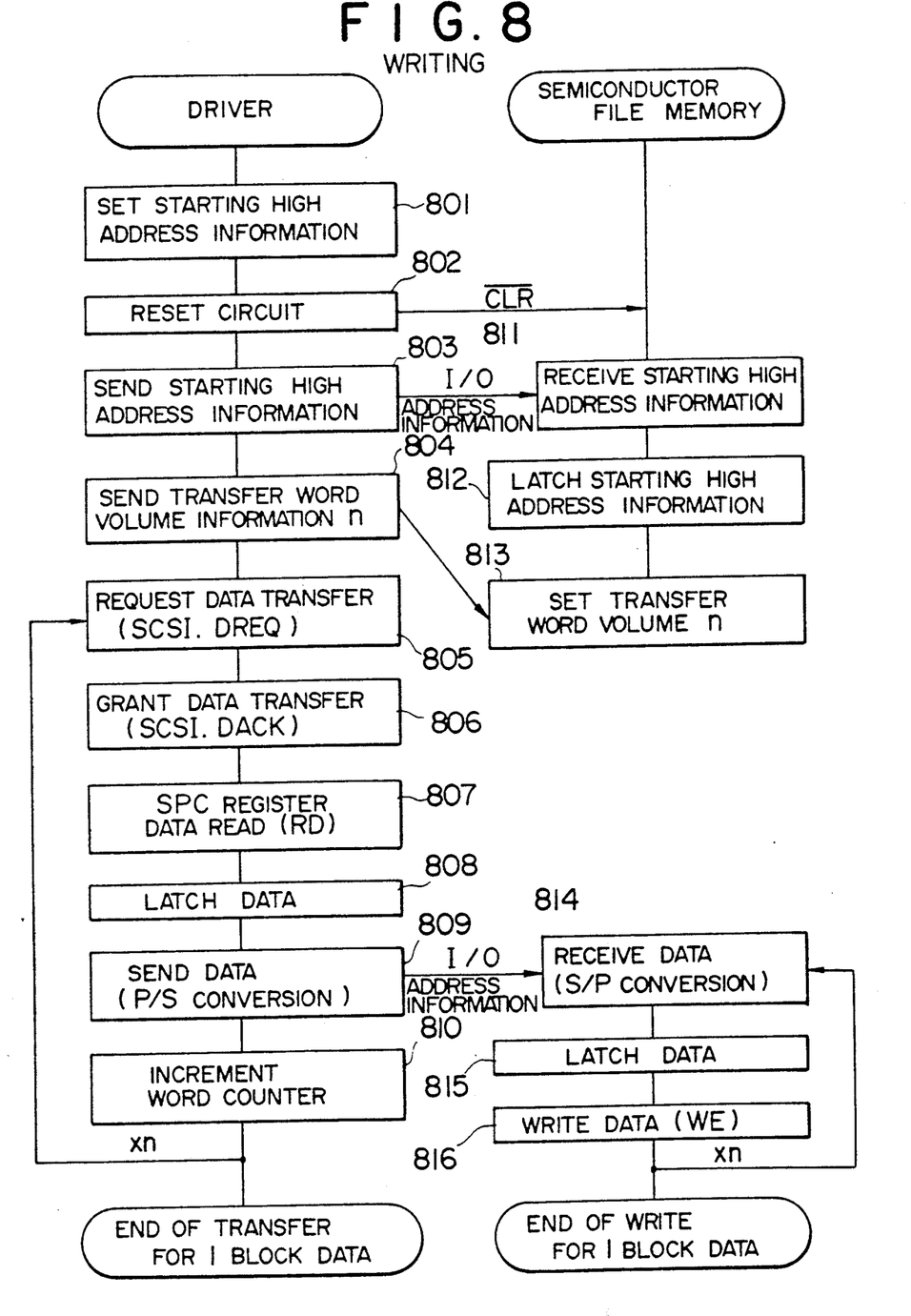
FIG. 8 is a flowchart showing the operational sequence of the driver and semiconductor file memory according to the writing data to the semiconductor file memory in the arrangement of FIG. 7.
Figure 9:
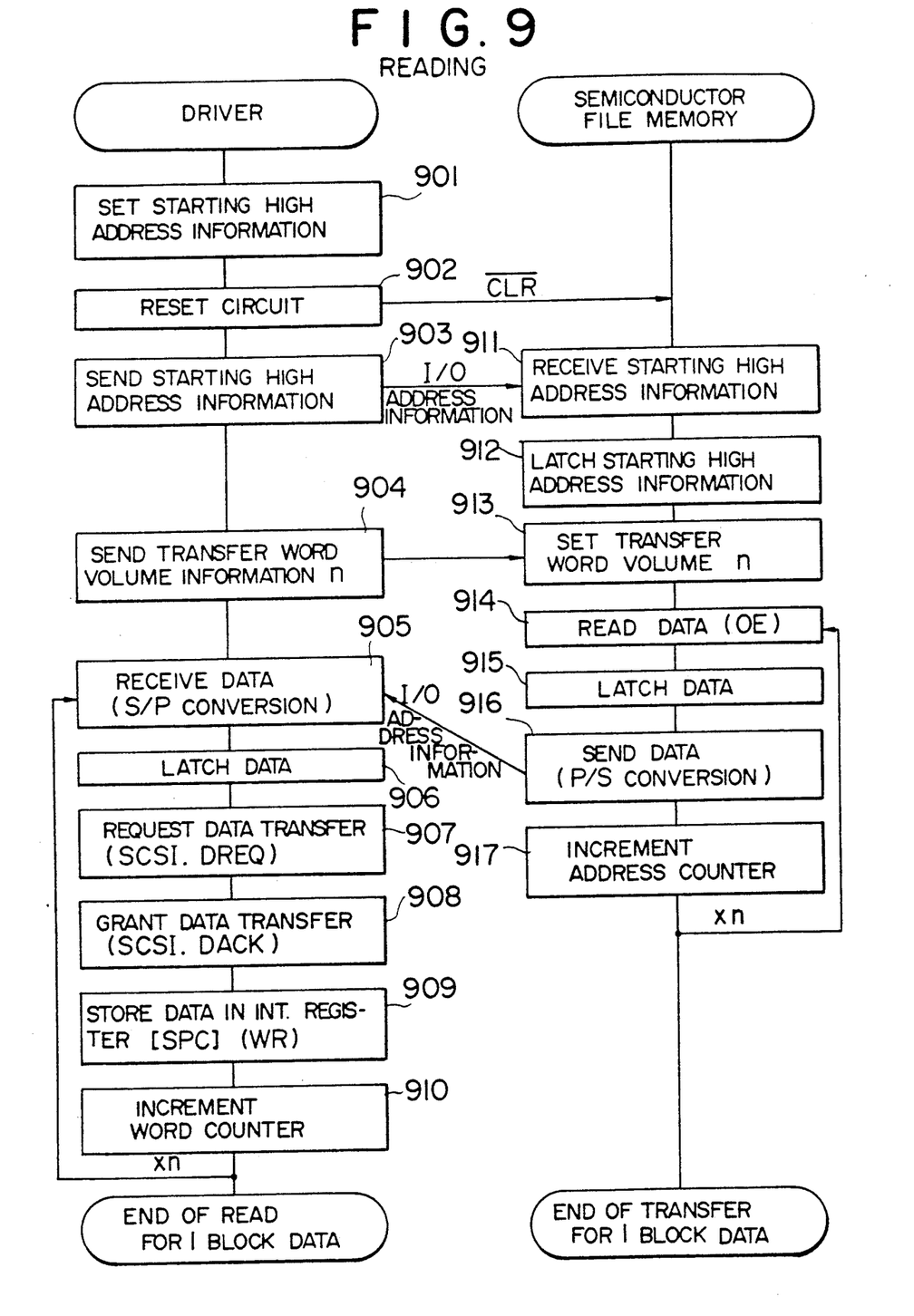
FIG. 9 is a flowchart showing the operational sequence of the driver and semiconductor file memory according to the reading data from the semiconductor file memory in the arrangement of FIG. 7.

In the case of reading data out of the semiconductor file memory 30, as shown in FIG. 9, processing steps from 901 to 904 pertinent to the read address on the part of the driver 20 and corresponding processing steps from 911 to 913 on the part of the semiconductor file memory 30 take place in the same manner as in the case of data writing shown in FIG. 8. Namely, in the case were the control circuit 34 receives the read control signal from the driver 20, it holds the starting address in the address latch circuit 32, and thereafter reads data in that address area in response to the read signal from the read/write control circuit 35 (step 914). After the data has been latched in the data latch circuit 33 (step 915), the parallel data is delivered to the parallel/serial control circuit 31a (step 916) so that it is converted into serial data. The serial data is sent from the file memory 20 by way of the data separation circuit 31. In the driver 20, the serial readout data sent from the file memory 30 is fed through the data separation circuit 28 and it is reformed into parallel data by the serial/parallel conversion circuit 28a (steps 905, 906), and the data is sent to the host computer 21 through the repetitive operation for one block (steps 907-910).

In the file memory 20, a data bus 38a is connected to the data input of the semiconductor memory 36, and an address bus 38b is connected to the address input of the semiconductor memory 36. An address decoding circuit 39 decodes part of address data from the address counter circuit 37 to produce signals for selecting address (or chips) of the semiconductor memory 36, and a power outage detection circuit 40 operates on a battery 41 to supply power to the semiconductor memory 36 so that the stored data is retained in the event of power interruption from the power source 23.

In this embodiment, the driver 20 and file memory 30 are connected through a total of six signal lines for implementing information transaction. The data transfer rate between the driver 20 and semiconductor file memory 30 is as high as several M bits/sec to 12M bits/sec or more.

The number of signal lines between the driver 20 and semiconductor file memory 30 can further be reduced by transmitting the synchronizing clock and the like on the basis of frequency multiplexing which allows signals to be transmitted over the same line.

Although in the foregoing embodiments the semiconductor file memory comprises the serial/parallel conversion circuit which receives serial data and converts it into parallel data to be stored in the semiconductor memory, the parallel/serial conversion circuit which receives parallel data read out of the semiconductor memory and converts it into serial data, the extraction circuit which extracts address data from serial data sent from an external device, the information separation circuit, etc., these circuit blocks may be integrated as an interface circuit, and this invention is not confined to the combination of circuits named as described above.

Transfer information data in the preceding embodiments may include read/write control information, character synchronizing information, etc., in addition to the starting address, transfer data word volume and transaction data.

The starting address and transfer word volume may be transferred earlier independently prior to transaction data, or they may be transferred at the same time. In reading data out of the semiconductor memory, the starting address and transfer word volume are transferred in advance.

In the following embodiments, in storing data in the semiconductor memory, data end information may be appended to the data, in place of the transfer data word volume information, so that the file memory detects the information to end the access to the semiconductor memory. Such data end detection can be implemented by merely decoding data in the input signal separation circuit. Accordingly, the word counter can be substituted by the end detection circuit which detects the end of transferred data. The term "word" used for the transfer data word volume does not imply a word of a specific number of bytes, but instead any quantity of information can be defined as a unit of word.

Although in the foregoing embodiments the address counter has access control, the address output of the microprocessor may be used for access.

Although a RAM is used as a semiconductor memory, other types of memories, such as an EEPROM can also be used.

By receiving serial data and converting it into parallel data inside the semiconductor file memory so that it is stored in the semiconductor memory, and by reading parallel data out of the semiconductor memory and converting it into serial data inside the storage so that it is transferred to the outside, the number of lines connected with external devices can be reduced, and as a result the number of connector pins can be reduced. Consequently, small insertion and extraction forces are required, and a highly reliable semiconductor external storage can be realized.

The semiconductor file memory receives the starting address of data access area in the semiconductor memory, transfer word volume information or transfer end information indicative of the volume of transferred data and transmission data corresponding to the address as a string of serial data included in the transfer information, and it sets the starting address to the address access circuit and sends the transfer word volume information or the like to the end detection circuit so that the semiconductor memory is accessed only for data in number corresponding to the transfer word volume, whereby only necessary data can be written or read. This enables reading and writing to take place for any volume of data on a case by case basis, and the volume of transferred data can be varied at any transfer event. Consequently, a specific address can be accessed in a short time, while at the same time mass data can be transferred at a short time in block transfer mode, and efficient data transfer which matches the volume of transferred data can be accomplished.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A semiconductor file memory having a semiconductor memory connected to an information processor and operating to store data transferred from said information processor and read out stored data, said file memory comprising a serial/parallel conversion circuit which receives, in a serial manner, data to be stored in said semiconductor memory and converts the data into parallel data; a parallel/serial conversion circuit which receives data read out of said semiconductor memory and converts the data into serial data; and an address data holding circuit which holds address data transferred from said information processor, wherein serial data transferred from said information processor is converted into parallel data by said serial/parallel conversion circuit and the converted data is stored in said semiconductor memory in accordance with address data held in said address data holding circuit, and wherein parallel data stored in said semiconductor memory is read out in accordance with address data held in said address data holding circuit, the readout data is converted into serial data by said parallel/serial conversion circuit and the converted data is transferred to said information processor.

2. A semiconductor file memory according to claim 1, wherein said file memory is connected to said information processor through at least six lines including a serial data transfer signal line, a synchronizing clock signal line, a circuit reset signal line, a write/read control signal line, a power supply line, and a ground line.

3. A semiconductor file memory according to claim 1, wherein said serial data transfer signal line has a data transfer rate of 12M bits/sec or higher.

4. A semiconductor file memory according to claim 2, wherein said address access circuit comprises an address counter and said information separation circuit comprises a microprocessor, a memory and a control program stored in said memory.

5. A semiconductor file memory according to claim 4, wherein said end detection circuit comprises a word counter which counts the number of words in the transmission data, and wherein said semiconductor memory, interface, address access circuit and word counter are packaged in a same case and connected with a semiconductor file memory driver through a connector.

6. A semiconductor file memory comprising a semiconductor memory; an interface which receives a serial data string containing address information indicative of a starting address for accessing said semiconductor memory from an external device, transfer word volume information indicative of the number of transferred words, and transmission data; an address access circuit which makes access to an address of said semiconductor memory; and an end detection circuit which detects the end of transferred data, wherein said interface separates the transfer word volume information from the serial data string and delivers the separated information to said end detection circuit, separates the address information from the serial data string and delivers the separated information to said address access circuit, sets the address information to said address access circuit and increments or decrements the set address information, and stores the transmission data in said semiconductor memory or read stored data out of said semiconductor memory, and wherein said end detection circuit detects the end of transferred data on the basis of the transfer word volume information and terminates the data writing or reading operation in response to the detection of the data end.

7. A semiconductor file memory according to claim 6, wherein said end detection circuit comprises a word counter which counts the number of words in the transmission data, and wherein said semiconductor memory, interface, address access circuit and word counter are packaged in a same case and connected with a semiconductor file memory driver through a connector.

8. A semiconductor file memory comprising a semiconductor memory; an interface which receives a serial data string containing address information indicative of a starting address for accessing said semiconductor memory from an external device. transmission data, and transfer end information; an address access circuit which makes access to an address of said semiconductor memory; and a detection circuit which detects the transfer end information, wherein said interface includes a serial/parallel conversion circuit which receives, in a serial manner, data to be stored in said semiconductor memory and converts the serial data into parallel data, a parallel/serial conversion circuit which receives, in a parallel manner, data read out of said semiconductor memory and converts the parallel data into serial data, and wherein the address data transferred from said external device is set in said address access circuit, the set address data is incremented or decremented, the transmission data is stored in said semiconductor memory or stored data is read out of said semiconductor memory, and the data storing or reading operation is terminated in response to the detection of transfer end information by said detection circuit.

9. A semiconductor file memory comprising a semiconductor memory; an interface which receives a serial data string containing address information indicative of the starting address for accessing said semiconductor memory from an external device, transmission data, and transfer end information; and address access circuit which makes access to an address of said semiconductor memory; and an information separation circuit which separates the address information from said serial data string, delivers the separated address information to said address access circuit and detects the transfer end information in the serial data string, wherein the address information is set in said address access circuit, the set address information is incremented or decremented, the transmission data is stored in said semiconductor memory or stored data is read out of said semiconductor memory, and the data storing or reading operation is terminated in response to the detection of the transfer end information by said information separation circuit.

10. A storage system having a driver which is connected directly or through a bus to an information processor, and a semiconductor file memory including a semiconductor memory which is connected to said driver and operating to store data transferred from said information processor and read out data, wherein said semiconductor file memory comprises a serial/parallel conversion circuit which receives, in a serial manner, data to be stored in said semiconductor memory and converts the data into parallel data; a parallel/serial conversion circuit which receives data read out of said semiconductor memory and converts the data into serial data; and an address data holding circuit which holds address data, transferred from said information processor wherein serial data transferred from said driver is converted into parallel data by said serial/parallel conversion circuit and the converted data is stored in said semiconductor memory in accordance with address data held in said address data holding circuit, and wherein parallel data stored in said semiconductor memory is read out in accordance with address data held in said address data holding circuit and the readout data is converted into serial data by said parallel/serial conversion circuit and the converted data is transferred to said driver, said driver transferring data from said semiconductor file memory to said information processor and transferring data from said information processor to said semiconductor file memory.

11. A storage system using a semiconductor file memory set forth in claim 10, wherein said file memory is connected to said driver through at least six lines including a serial data transfer signal line, a synchronizing clock signal line, a circuit reset signal line, a write/read control signal line, a power supply line, and a ground line, and wherein data is transferred in a parallel manner between said driver and said information processor.

* * * * *